(12) United States Patent
Aikens et al.

(10) Patent No.: US 12,346,103 B2
(45) Date of Patent: Jul. 1, 2025

(54) SYSTEM AND METHOD FOR DIAGNOSING A MANUFACTURING LINE USING TAGGED DATA

(71) Applicant: ATS Corporation, Cambridge (CA)

(72) Inventors: Stephen Fisher Aikens, Cambridge (CA); Ian Cameron, Cambridge (CA); Stanley Kleinikkink, Cambridge (CA); Daniel Blair De Verteuil, Cambridge (CA)

( * ) Notice: Subject to any disclaimer, the term of this patent is extended or adjusted under 35 U.S.C. 154(b) by 0 days.

(21) Appl. No.: 16/315,859

(22) PCT Filed: Jul. 7, 2017

(86) PCT No.: PCT/CA2017/050824
§ 371 (c)(1),
(2) Date: Jan. 7, 2019

(87) PCT Pub. No.: WO2018/006177
PCT Pub. Date: Jan. 11, 2018

(65) Prior Publication Data
US 2019/0302751 A1    Oct. 3, 2019

Related U.S. Application Data

(60) Provisional application No. 62/359,427, filed on Jul. 7, 2016.

(51) Int. Cl.
G05B 23/02 (2006.01)
G05B 19/042 (2006.01)
G05B 19/418 (2006.01)

(52) U.S. Cl.
CPC ..... *G05B 23/0264* (2013.01); *G05B 19/0428* (2013.01); *G05B 19/41825* (2013.01);
(Continued)

(58) Field of Classification Search
CPC ............ G05B 23/0264; G05B 19/0428; G05B 23/0297; G05B 19/41825; G05B 19/4183;
(Continued)

(56) References Cited

U.S. PATENT DOCUMENTS 8,073,239 B1 * 12/2011 Bahrami ................. G06T 7/001
382/143
8,473,143 B2    6/2013 Stark et al.
(Continued)

FOREIGN PATENT DOCUMENTS

CN    101635835 A  *  1/2010
EP    2903005 A1    8/2015

OTHER PUBLICATIONS

Canadian Intellectual Property Office as International Searching Authority, International Search Report for PCT/CA2017/050824, Oct. 12, 2017.
(Continued)

*Primary Examiner* — Tameem D Siddiquee
(74) *Attorney, Agent, or Firm* — Amarok IP Inc.; Neil W. Henderson

(57) ABSTRACT

The disclosure is directed at a method and system for diagnosing automation elements. The method and system include the determination of a trigger condition or event within operation data received from the automation elements. Based on the trigger condition or event, feed-back data captured by data collection devices is tagged and stored and/or captured and stored for review by an end user. The feed-back data may be stored together with associated operation data to assist in identifying faults, the causes of faults, or the like in the automation elements, in the products produced, or in the manufacturing process or overall manufacturing system.

15 Claims, 5 Drawing Sheets

(52) U.S. Cl.
CPC ... *G05B 19/4183* (2013.01); *G05B 19/41875* (2013.01); *G05B 23/0297* (2013.01)

(58) Field of Classification Search
CPC .................. G05B 19/41875; G05B 19/042; G05B 23/02; G05B 23/0221; G05B 23/0235
See application file for complete search history.

(56) References Cited

U.S. PATENT DOCUMENTS

| | | | |
|---|---|---|---|
| 8,970,703 | B1 | 3/2015 | Thomas, II et al. |
| 9,143,563 | B2 | 9/2015 | Pingel et al. |
| 9,509,904 | B2 | 11/2016 | Dinev |
| 9,613,332 | B2* | 4/2017 | West ................ H04N 5/772 |
| 2003/0225936 | A1* | 12/2003 | Felske ............... H04L 41/042 |
| | | | 719/328 |
| 2006/0048025 | A1* | 3/2006 | Filipovic ............ G07C 3/005 |
| | | | 714/724 |
| 2006/0177119 | A1 | 8/2006 | McPheely et al. |
| 2007/0139524 | A1 | 6/2007 | Lozler |
| 2009/0149981 | A1 | 6/2009 | Evans et al. |
| 2011/0157357 | A1* | 6/2011 | Weisensale ......... F24F 11/30 |
| | | | 348/143 |
| 2013/0218783 | A1* | 8/2013 | Anand ............... G06Q 10/20 |
| | | | 705/304 |
| 2013/0258063 | A1* | 10/2013 | Lee .................... H04N 7/181 |
| | | | 348/47 |
| 2015/0213838 | A1* | 7/2015 | Dinev ................ G11B 27/031 |
| | | | 386/224 |

OTHER PUBLICATIONS

Canadian Intellectual Property Office as International Searching Authority, International Preliminary Report on Patentability for PCT/CA2017/050824, Jan. 8, 2019.

Imperx, "EIPVR EtherNet/IP™ Process Video Recorder". [online] [retrieved on Dec. 4, 2019]. Retrieved from the Internet: ,http://www.imperx.com/eipvr-ethernet-ip-process-video-recorder/.

European Patent Office, European Search Opinion in corresponding EP application No. 17823381.3 dated Feb. 1, 14, 2020.

* cited by examiner

SYSTEM AND METHOD FOR DIAGNOSING A MANUFACTURING LINE USING TAGGED DATA

REFERENCE TO RELATED APPLICATION

This application is a formal application based on and claiming the benefit of U.S. provisional application No. 62/359,427, filed Jul. 7, 2016 which is hereby incorporated herein by reference.

FIELD

The present disclosure relates generally to a system and method for diagnosing automation systems. More particularly, the present disclosure relates to a system and method for gathering data to be used in identifying problems/issues in a manufacturing or automation environment.

INTRODUCTION

Modern manufacturing and automation systems and processes are becoming more complex because these systems and processes are required to be fast, accurate and repeatable in order to provide appropriate product quality in short time frames. These systems and processes also seek to provide high machine efficiency with low downtime for maintenance, trouble-shooting and the like. For existing manufacturing and automation systems and processes, there is also a trend to provide on-going improvement in one or more of these factors in order to keep pace with the changing manufacturing environment.

Some manufacturing and automation systems have sophisticated technologies for identifying defects in products produced, stoppages/slowdowns in equipment being used, or the like and, in some cases, will have the capability to stop the manufacturing or automation system until the issue/problem/fault can be identified. However, it can still be difficult to determine the cause or source of the defect or machine stoppage in order to remedy the issue/problem. This difficulty is, at least in part, due to the complexity and speed of the manufacturing and automation systems. Determining the cause or source of an issue/problem/fault can be particularly difficult for occasional or intermittent faults that can occur at varying times. This difficulty in identifying faults can arise when starting to use a new system or process as well as during on-going operation of systems and processes that may have faults such as break-downs, misalignments or the like.

While some systems and methods for diagnosing automation systems using cameras are known, they tend to be complicated, difficult to configure and difficult to retrofit to existing automation systems. For example, a camera may need to be connected with a machine controller, such as a PLC, and the PLC may need to be re-programmed to provide a trigger signal for determining the video data to be recorded, and electrical trigger hardware may need to be connected to the camera.

As such, there is a need for improved systems and methods of diagnosing or debugging issues/problems in manufacturing and automation systems.

According to one aspect herein, there is provided a method for diagnosing a manufacturing line having at least one automation element, the method including: receiving, at a processor, operation data from the at least one automation element; determining a trigger condition based on the operation data from the at least one automation element; capturing feed-back data at a data collection device associated with the at least one automation element; and storing the feed-back data relating to the trigger condition in association with the operation data and trigger condition.

In a particular case, the method may further include, after determining the trigger condition, triggering the data collection device to capture and store the feed-back data for a particular capture time period. In this case, the capture time period may include a pre-event capture period occurring before the trigger event and/or a post-event capture period occurring after the trigger event. Further, in some cases, the operation data may be received from an automation controller that controls operation of the automation element, and the trigger condition and the data collection include a configurable setting independent of the automation controller.

In another case, the method may further include, after determining the trigger condition, tagging the feed-back data to include identification reflecting a trigger event associated with the trigger condition has occurred. In this case, the tagging may include inserting time stamps within the feed-back data. Alternate lately or in addition, the tagging may include inserting an indication whether a fault has been detected, whether a part has been rejected or whether a machine state change has been detected. Further alternately or in addition, the tagging may include inserting a part-tag associated with a particular part travelling through the manufacturing line.

According to another aspect herein, there is provided a system for diagnosing a manufacturing line including at least one automation element and operation data related to the at least one automation element, the system for diagnosing including: at least one data collection device for collecting feed-back data related to the at least one automation element; and at least one server module, which may include at least on processor and at least one storage device, configured to receive the operation data, determine events based on the operation data, and, depending on the event, trigger the at least one data collection device to send collected feed-back data to the at least one server module.

In one particular case, the at least one server module may trigger the at least one data collection device to send a predetermined time period of collected feed-back data.

In another case, the at least one server module may be configured to embed a tag within the collected feed-back data, for example, a part-tag associated with a particular part travelling through the manufacturing line.

In yet another case, the at least one data collection device may include a storage device, such as a memory, and the at least one data collection device is configured to continuously collect feed-back data and store the data in the memory.

In still yet another case, the at least one server module may receive operation data from an automation controller that controls operation of the automation element, and the at least one server module triggers the data collection device with a configurable setting independent of the automation controller. In this case, the configurable setting may include a pre-event capture time and a post-event capture time.

In yet another case, the at least one data collection device may be separate and independent of the manufacturing line and the equipment on the manufacturing line. In this way, the data collection device can be moved freely and may, in some situations, be excluded from any regulatory requirements regarding the manufacturing line, or the like.

In still yet another case, the at least one server module may trigger the at least one data collection device via an application programming interface of the at least one data collection device.

In a further case, the system may further include at least one data collection server in communication with the at least one data collection device and configured to store the collected feed-back data received from the at least one data collection device. In this case, the at least one data collection server may store the collected feed-back data for a predetermined storage period.

In yet another case, the at least one server module may include: a processor; a diagnostic module that, via the processor, determines the events from the operation data and identifies trigger conditions; a camera trigger module that, responsive to the trigger conditions received from the diagnostic module, generates a trigger; a camera application programming interface that receives the trigger from the camera trigger module and triggers the camera to provide a predetermined time period of collected feed-back data to the diagnostic module, wherein the diagnostic module outputs the predetermined time period of collected feed-back data to an end user.

According to another aspect, there is provided a system for diagnosing a manufacturing line including at least one automation element and a data feed related to the at least one automation element, the system for diagnosing including: at least one camera for collecting video data related to the at least one automation element; a processor; a diagnostic module that, via the processor, monitors the data feed and identifies trigger conditions; a camera trigger module that, responsive to the trigger conditions received from the diagnostic module, generates a trigger; a camera application programming interface that receives the trigger from the camera trigger module and triggers the camera to provide a predetermined time period of collected data to the diagnostic module, wherein the diagnostic module outputs the predetermined time period of collected data to a user interface (i.e. display) or to a memory.

Other aspects and features of the embodiments of the system and method will become apparent to those ordinarily skilled in the art upon review of the following description of specific embodiments in conjunction with the accompanying figures.

BRIEF DESCRIPTION OF THE DRAWINGS

Embodiments of the system and method will now be described, by way of example only, with reference to the attached Figures, wherein.

DETAILED DESCRIPTION

The following description, with reference to the accompanying drawings, is provided to assist in understanding the example embodiments. The following description includes various specific details to assist in that understanding but these are to be regarded as merely examples. Accordingly, those of ordinary skill in the art will recognize that the various embodiments and changes and modifications thereto described herein can be modified without departing from the scope and spirit of the appended claims and their equivalents. In addition, descriptions of well-known functions and constructions may be omitted for clarity and conciseness.

The terms and words used in the following description and claims are not limited to their bibliographical meanings, but, are meant to be interpreted in context and used to enable a clear and consistent understanding.

Generally, the present document provides systems and methods for monitoring and/or diagnosing automation systems. In one embodiment, the system and method may include a trigger-driven data gathering approach. In another embodiment, the system and method may include a tagging approach with regard to continuously gathered data. Automation stations are used on manufacturing or production lines to handle manufacturing operations. An automation station may include a single machine in a production line, such as a press or the like, but may also include a complex system involving robots, conveyors, manipulators, and the like.

Figure 1:
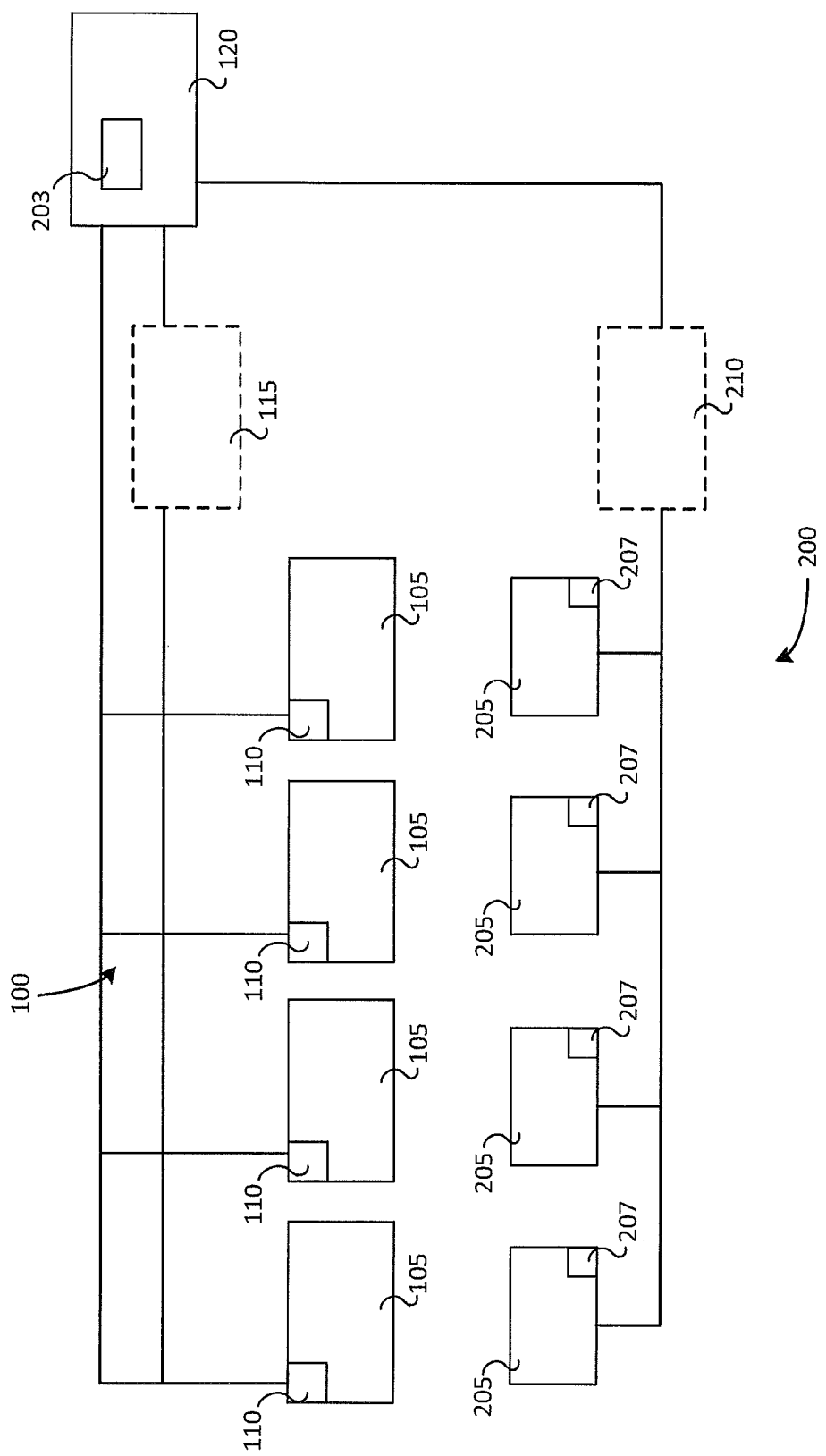
FIG. 1 is a block diagram illustrating an embodiment of a system for diagnosing automation systems and an example environment for the system.

FIG. 1 shows an example environment that includes a diagnostic system 200 according to an embodiment herein. A production line 100 includes at least one automation station, or automation element, 105 (which in the current example includes four automation stations 105). As noted above, the automation stations 105 may be, for example, individual machines or equipment, or a combination of machines or equipment, or the like. Each automation station 105 may include an automation controller, such as a programmable logic controller (PLC) 110, which controls the automation station 105. Each PLC 110 is generally in communication with one or more servers or controllers, which may include a production controller 115 and may also or alternatively include a production monitoring server 120. The production controller 115 may provide direct control to and configuration of the PLCs 110 and monitor the overall production line 100. The production monitoring server 120 may monitor and process various operation data received from each PLC 110. Examples of operation data could include, but is not limited to, machine identification, timestamp, full machine state, environmental conditions, or any other data that could be provided in relation to a machine or automation station 105 in the production line. The production controller 115 and the production monitoring server 120 may include a processor and memory (not shown in FIG. 1) allowing for the processing of various operations by each of these elements. It will be understood that the production controller 115 and the production monitoring server 120 may be combined or may be housed on a single physical computing device or may be distributed across a number of devices. (For the purposes of this document, the combination of the production controller 115 and the production monitoring server 120 may also be referred to as "production monitoring server 120".)

The diagnostic system 200 according to an embodiment herein, includes a server module 203 (in this case, provided in the production monitoring server 120) and one or more data acquisition or collection devices 205. The server module 203 monitors the operation data received from the PLC 110 and determines trigger conditions or events that can be used to cause/trigger the data collection devices 205 to provide feed-back data, related to an event that caused the trigger condition, to the server module 203. In the description herein, the term "trigger condition" will refer to an occurrence that may benefit from a review of the feed-back data, such as video, taken around the time frame of the event/trigger condition by one or more of the data acquisition devices.

Trigger conditions determined from the operation data may include machine stoppages, faulty part detection, out of specification operations or parts, a machine not responding or taking an action within or after a set time period, a combination of events or data, and the like. Generally speaking, the trigger condition initiates or indicates a time at which feed-back data (sometimes also referred to as "collected data") is to be gathered or reviewed and the server module 203 causes the data collection devices 205 to provide feed-back data to the server module 203. As described further below, the feed-back data is a set of data collected around the time of the trigger condition as determined by the server module 203.

In this way, since the data collection devices 205 are triggered by the server module 203 rather than by the PLC 110 or production controller 115 or the like, there is no need to reconfigure the PLC 110 or other elements that may directly affect the production environment. This ability to trigger data collection devices 205 without affecting the production environment can be effective at reducing costs and complexity. For example, in a heavily regulated environment, such as manufacturing of drugs, medical devices, or the like, it can be very difficult or expensive to make modifications to validated manufacturing lines that have undergone regulatory testing. In such cases, changes to the validated manufacturing line, such as reprogramming PLCs, may require extensive approvals and re-validation, which can be cost prohibitive.

In FIG. 1, four data collection devices 205 are shown. Data collection devices 205 may be any of various devices capable of collecting feed-back data that might be useful in diagnosing an issue. Data collection devices 205 may include, in a non-exhaustive list, cameras, pressure sensors, accelerometers or other motion sensors, thermal sensors, vibration sensors, humidity sensors, temperature sensors, and the like. The feed-back data collected by the data collection devices will depend on the type of data collection device 205 but may, for example, include images/video, pressure data, motion data, heat data, humidity data, temperature data and the like. It will be understood that the data collection devices 205 may preferably be small and portable and may be wirelessly connected with the server module 203 so that they can be easily moved to different locations in relation to the one or more automation stations 105 of the production line 100. However, in general, the terms "connected" and "communicate" in this document may refer to either wired or wireless digital connections or communications, depending on the environment.

Each data collection device 205 may include a memory 207 for storing data captured by the data collection device 205. In some cases, the data collection device 205 may be in communication with a data collection server 210 where additional data may be stored if the memory 207 is not present or is not sufficiently large. Each data collection device 205 may continuously collect data and, if the memory 207 (or data collection server 210) becomes full, add new data to over-write the oldest data collected. The data collection devices 205 are in communication with the production monitoring server 120 and the server module 203, either directly or via the data collection server 210.

Figure 2:
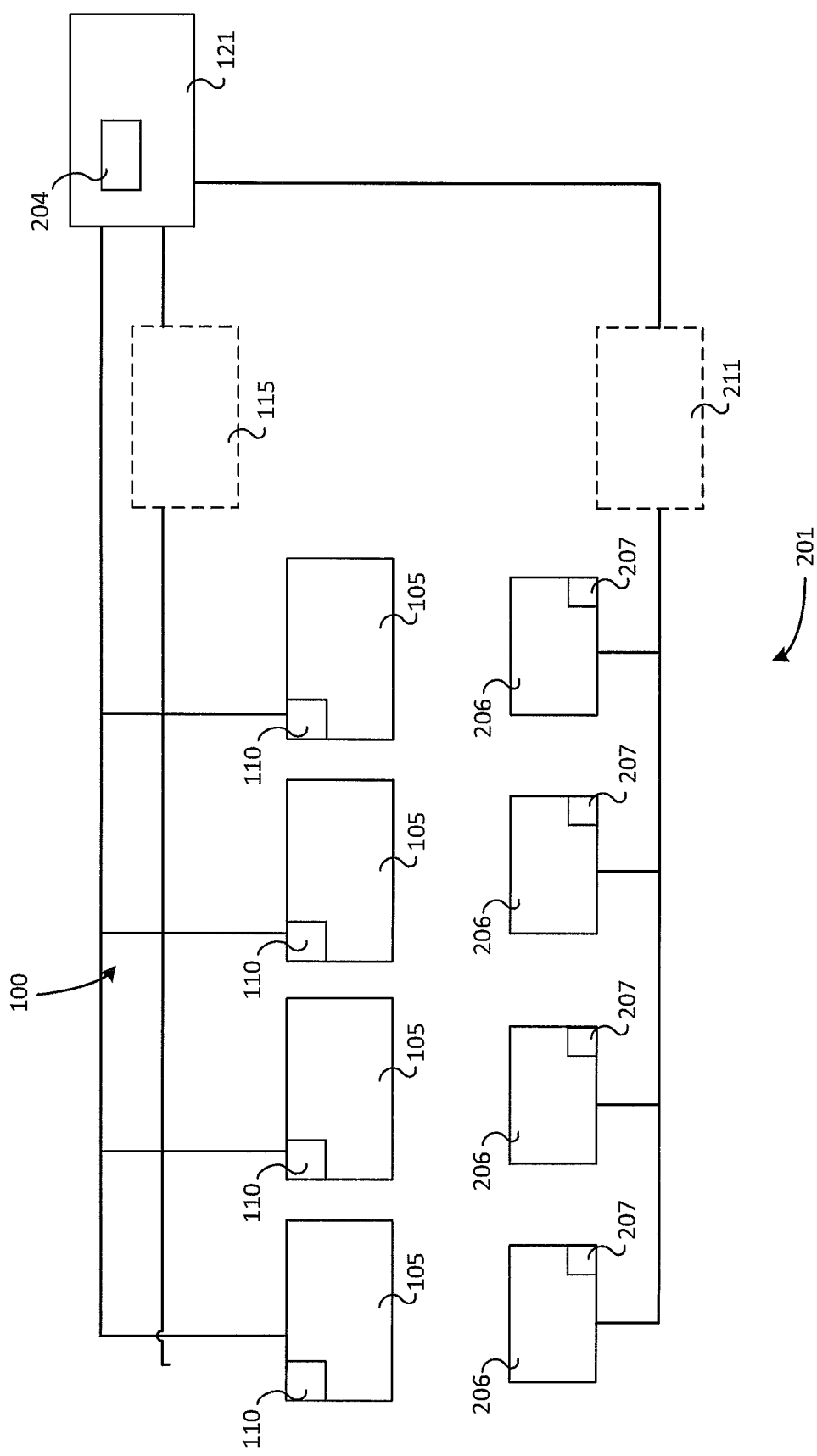
FIG. 2 is a block diagram illustrating another embodiment of a system for diagnosing automation systems and an example environment for the system.

In a particular case, as shown in FIG. 2, in an alternative system 201, the production server 120 may be an overall equipment effectiveness (OEE) server 121 and the server module 203 may be an OEE module 204 on the OEE server 121. As noted above, the production controller 115 may alternatively include the OEE module 204 or be in place to provide communication with the OEE server 121 to pass data from the PLCs 110 along to the OEE module 204. In some environments, the OEE module 204 may be distributed over a number of devices including, for example, production controller 115 and OEE server 121. In this example, the data collection device 205 may be a camera 206 and the data collection server 210 may be a camera server 211.

The OEE module 204 is provided with an interface module (not shown in FIG. 2) for interaction with the cameras 206. The interface module is configured to, upon detection of a trigger condition by the OEE module 204, send a message to at least one of the cameras 206 requesting feed-back data (which in the current embodiment is video) for a period before and after the time of the trigger condition. The period before and after the time of the trigger condition may be a predetermined or specified period, may be looked up or calculated, or the like. The OEE module (or the interface module) is also configured to receive video from the cameras 206 and store the video in association with the operation data, other data available to the camera server 211, OEE module 204, or the like.

Figure 3:
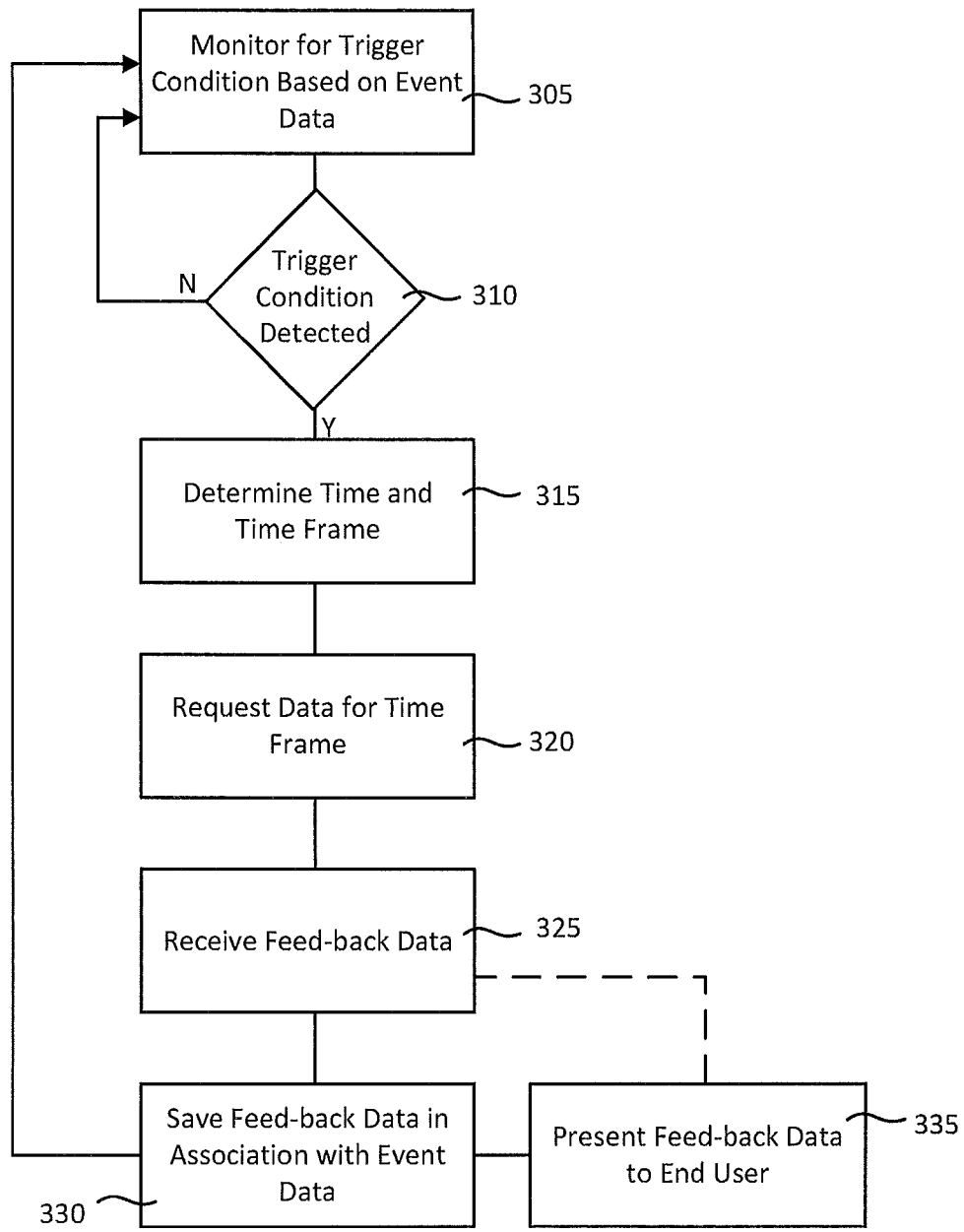
FIG. 3 is a flowchart of an embodiment of a method for diagnosing automation systems.

FIG. 3 is a flowchart of an embodiment of a method 300 of diagnosing automation stations (such as automation station 105). In this case, a diagnostic system (such as diagnostic system 100 or 200, using the diagnostic system 200 in this example) may be installed and started, and the diagnostic system 200 may then proceed to monitor the operation data, or data feed, from the PLCs 110 for one or more trigger conditions 305 related to the automation station 105 or the production line 100 or the like.

When a trigger condition is detected 310, the diagnostic system 200 determines the time of the trigger condition and a time frame/period related to the event or trigger condition 315 (e.g. for the purpose of collecting or gathering feed-back data). The time frame may be a predetermined time frame of a set period, may be based on the type of trigger condition, for example, via a look-up table or the like, or may be calculated, either in real time or in advance, based on the type of trigger condition. The time frame may generally include a predetermined amount of time before the trigger condition and may also include a predetermined amount of time after the trigger condition. In some cases, the time frame/period may be on the order of microseconds, hundreds of seconds, tenths of seconds, seconds, minutes, hours or longer. In some cases, the time frame/period may be limited by the amount of memory storage available or accessible. The amount of time before and after may be different or may be the same for different triggers or the like. The time frame may be different for different automation stations 105.

As long as there is no trigger condition detected, the system 200 continues to monitor for trigger conditions 305.

After determining the time (i.e. time of the trigger condition) and time frame/period, the server module 203 requests the feed-back data for the time frame 320 from one or more of the data collection devices 205. In some cases, the server module 203 may request the feed-back data for the time frame from the data collection server 210.

The data collection device 205 accesses its memory 207 and sends the feed-back data for the time frame to the server module 203, which receives the feed-back data 325 and stores the feed-back, or collected, data 330, generally with an association to operation data related to the trigger condition.

The system 200 then returns to monitoring for trigger conditions 305 and the system 200 can present the feed-back data to an end user 335, such as via a diagnostic module, either on a push basis (i.e. sending it to an end user) or pull basis (i.e. wait for an end user to request the feed-back data). The feed-back data may be presented together with the trigger condition and/or operation condition that caused the trigger condition and other related data, including other feed-back or collected data, information on the product being produced, and the like. An operator or programmer may also configure the system to automatically generate additional triggers based on, for example, the type of an initial trigger or the like.

Figure 4:
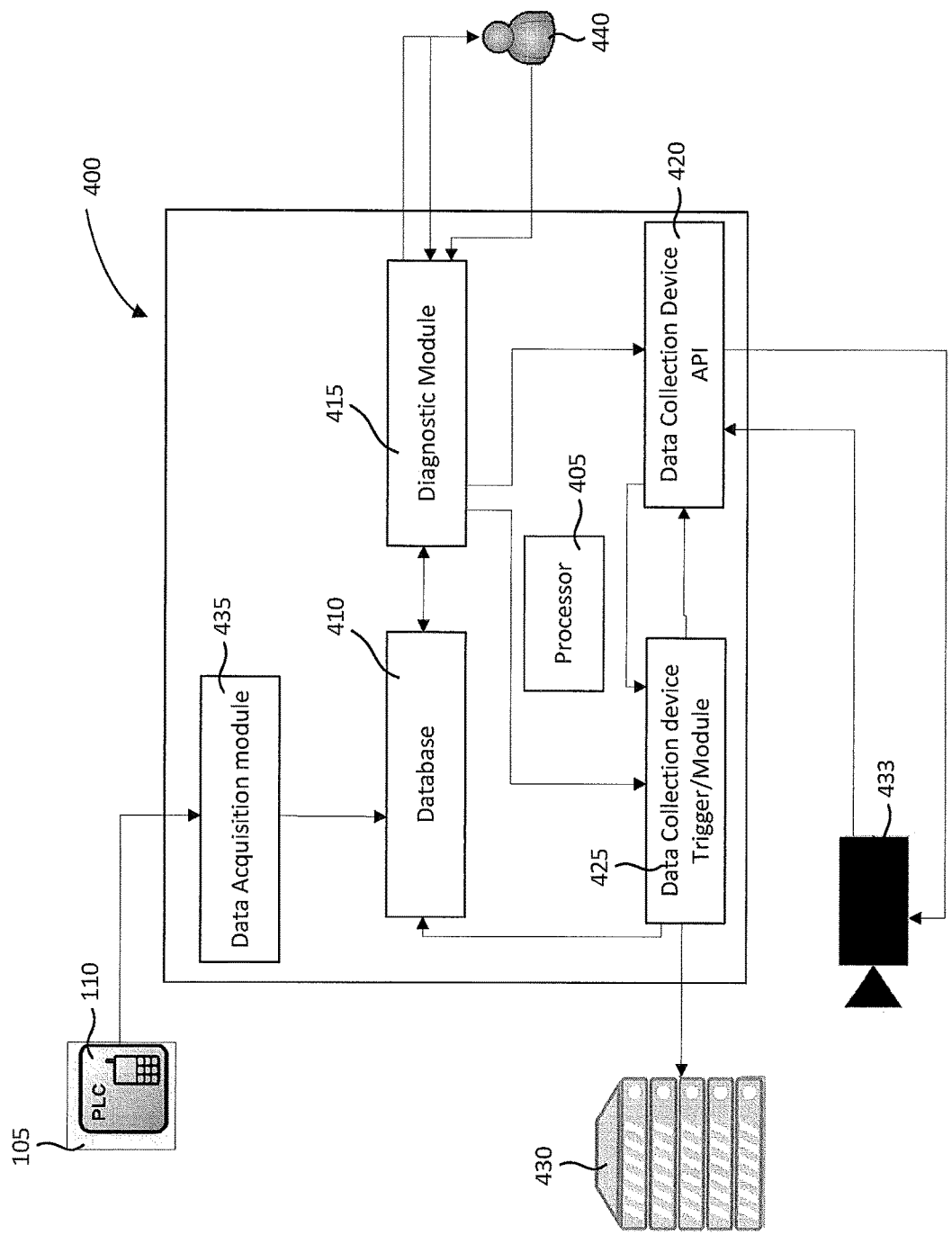
FIG. 4 is a block diagram illustrating another embodiment of a system for diagnosing automation systems.

FIG. 4 is a block diagram illustrating another embodiment of a system for diagnosis, or diagnostic system 400 for automation stations. The system 400 includes a processor 405, a memory storage (such as database 410), a diagnostic module 415, a data collection device application programming interface (API) 420, and a data collection device trigger module 425, as well as storage 430. The processor 405 may be seen as part of the production monitoring server 120, the production controller 115 and/or the data collection server 210 and/or any combination thereof.

The system 400 also includes one or more data collection devices, illustrated as cameras 433 in the current embodiment. The system 400 may also include a data acquisition module 435, which receives data from the one or more PLCs 110 related to the one or more automation stations 105.

As the PLC data flows into the system 400, the processor 405 reviews the operation, or PLC, data and monitors for data representing trigger conditions. As noted above a trigger condition is generally data related to some form of fault or error in the production process. For example, the processor 405 may monitor for faults (for example, unscheduled machine stoppage), rejects (for example, a faulty part produced), or other events of this nature.

The incoming operation data may be saved by the processor 405 into the database 410. The operation data is also communicated to the diagnostic module 415. The diagnostic module 415, via the processor 405, determines the type of event and, if the event relates to a trigger condition, determines the time of the trigger condition and a time period/frame around the time of the trigger condition. In some cases, the processor 405 may only save operation data related to trigger conditions to the database 410 instead of saving all operation data.

After determining the time of the trigger condition, the diagnostic module 415 sends a trigger to the data collection device trigger module 425 and the data collection device trigger module 425 sends a trigger to the data collection device API 420 to cause the data collection device, or camera, 433 to send the time frame/period of feed-back data (which may be a captured video) back to the data collection device API 420. The data collection device API 420 then sends the captured video to the data collection device trigger module 425, which stores the captured video in the database 410, generally in association with the operation data related to the event or trigger condition data. In some cases, the captured video may be stored in a video storage 430 and a link to the stored file is stored in the database 410.

The diagnostic module 415 can then notify an end user 440 of the availability of the captured video and/or display the captured video to the end user 440. The end user 440 views the captured video on any appropriate display, including mobile displays or the like, in order to determine the cause of the event/trigger condition and can then take any corrective action needed. The end user 440 can also configure and apply settings for the data collection device(s) 433.

The diagnostic module 415 may also provide access for the end user 440 to enter configurable settings for the system 400, for example by setting the types of events/trigger conditions for monitoring, the predetermined time frames/periods or ways of calculating the time frames/periods, and other characteristics of the system 400. Configurable settings may include any of a variety of settings related to the data collection device(s), including data or time ranges, voltages, currents, amplitudes, frequencies, and the like. As described above, the configurable settings are independent of the automation controller and validated manufacturing line. The diagnostic module 415 may also communicate with the data collection device API 420 to configure the camera 433 to receive the trigger signal and submit the feed-back data when the trigger signal is received.

In the above embodiment, generally speaking, one or more digital cameras 433 are provided to monitor machines or equipment at automation stations 105 on a production line 100 and the operation thereof. The set of digital cameras 433 is operatively connected to one or more servers such as the production monitoring server 120 or server module 203 that control camera operation. The set of digital cameras 433 are preferably located along the production line 100 in such a way that the cameras 433 can monitor the operation of one or more automation stations 105 of the production line (ideally, at least key elements or suspected problem areas) but may be provided to monitor all automation stations 105 of the production line 100, where appropriate. The number of cameras 433, including camera characteristics such as camera resolution and frame rate, is determined based on the various production line characteristics, such as number of automation stations 105, speed, known fail points, and the like. In some cases, multiple cameras may be targeted at one area or automation station 105 from different angles. Each camera 433 captures data either continuously or at predetermined times/intervals, for example, based on machine operating times or product timing or the like. The captured data is transmitted over, for example, a local area network (LAN) or other type of network that may be either wired or wireless. Further, the collected data can be maintained for as long as needed or, for example, based on information received from the diagnostic module 415, for review by maintenance personnel to allow them to determine the cause of the problem/stoppage more quickly and efficiently.

As noted above, various other data collection devices 205 may also be used in place of the camera 433 in the above embodiment in order to collect other types of feed-back data and display the other types of feed-back data to the end user 440 or provide the data to an analytics engine (not shown). The review of data may be performed on-line (i.e. in real time) or may be saved for off-line analysis.

In some embodiments, the cameras 433 may be continuously recording data (at least while the automation station 105 is in operation) so the diagnostic module 415 may also provide the capability to provide live data from the camera 433 to an end user 440.

Figure 5:
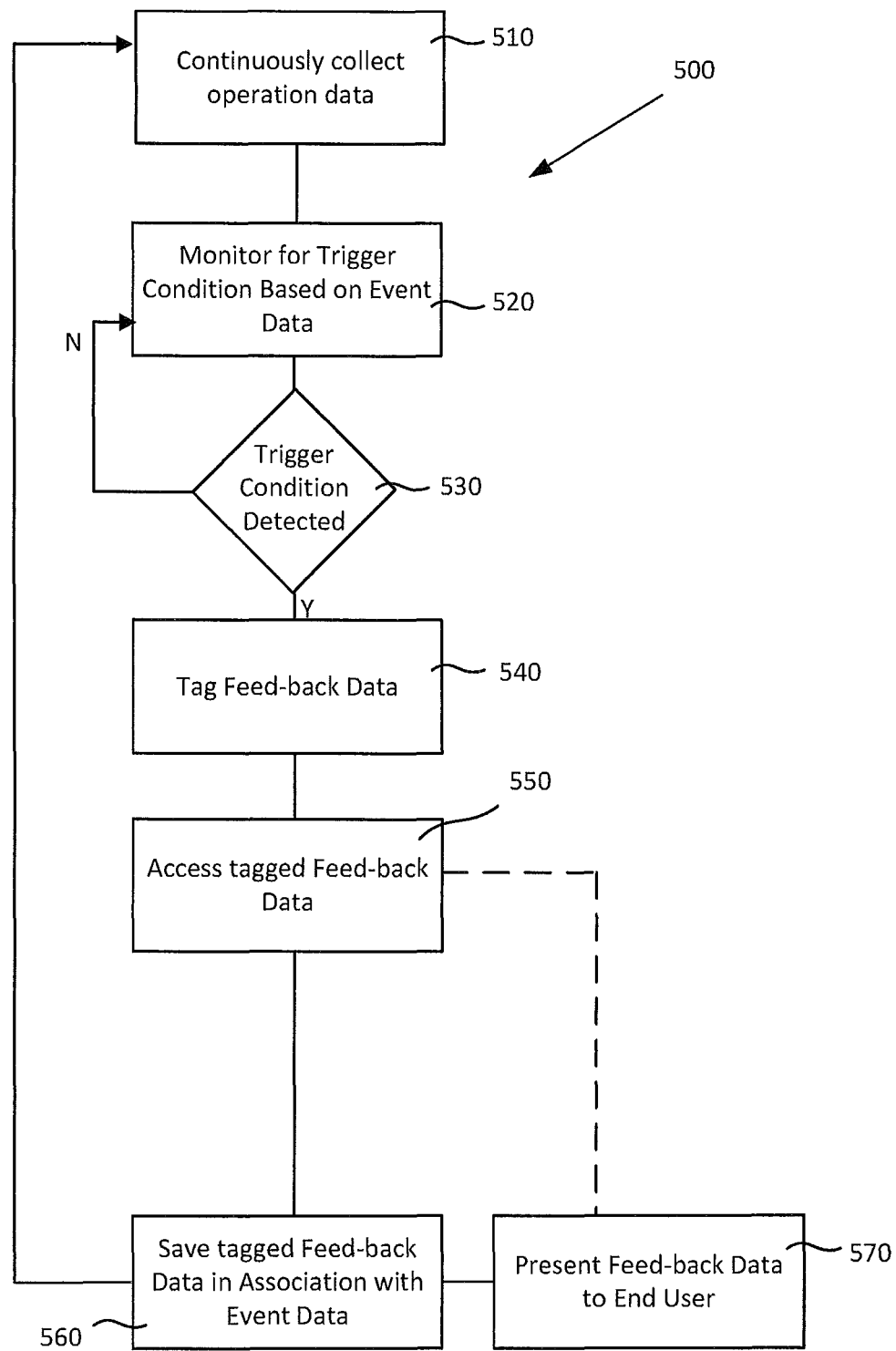
FIG. 5 is a flowchart of another embodiment of a method for diagnosing automation systems.

Turning to FIG. 5, a flowchart of a method 500 of diagnosing automation systems is shown, in this case, by capturing live data for diagnosing automation stations. In this case, at 510, feed-back or operating data is continuously collected but, rather than selecting segments of data related to a trigger event for review, the continuously collected data is tagged, based on a trigger event or the like, for review by an end user. As above, the feed-back data, now including the tags, can also be stored in the memory 207 or data collection server 210.

In some examples, the tag may be a "part-tag" associated with a particular part or product travelling through a manufacturing line such that the feed-back data includes a tag at the moment when a part is at or passing a particular automation station. In these cases, the end user may be able to view all feed-back data for a particular part after a fault is discovered (such as a defective part). Viewing the part related feedback data may enable the end user to identify or determine the cause of the defect. This can be used to help fix the problem/issue, or alternatively, identify other parts that might have been affected by the same problem/issue. This can be particularly useful in product recall scenarios.

As an example, the feed-back data collected or captured by the data collection devices 205 is continuously transmitted to and received by the data collection server 210 for storage. In the following, the feed-back data is considered a video stream but other types of data could also be tagged in a similar approach.

At 520, the system monitors for a trigger condition or event (such as a particular part entering an automation station 105). If a trigger condition or event is detected by the diagnostic system (as described above) at 530, the continuous feed-back data can be tagged based on the appropriate time frame at 540. For example, the tagging may include a part number, a time-stamp, a "pre-event" tag at the beginning of the time frame, an "active" tag at the time of the trigger event, and a "post-event" tag at the end of the time frame. The feed-back data may also be tagged with other identifiers related to the trigger event that has occurred, for example, the machine identifier where the trigger was detected, the operating condition of the machine at the time of the trigger, or the like. In some cases, the time frame may be very short so that all of these tags might not be needed. In some embodiments, the feed-back data may also be manually tagged/bookmarked by an end user. Other types of tags may also be placed in the feed-back data, such as machine state changes, DCS events, the data collection device identification, or the like In this embodiment, since the feed-back data is continuously captured, an end user can access the feed-back data and move directly to the point (based on a tag) in the feed-back data where a trigger event occurred, while still having the opportunity to review the feed-back data outside of the tagged time frame. In some embodiments, an operator may be able to filter the feed-back data based on various tags to view selected tags, for example, the operator may be able to filter by part-tag so that the operator can view all feed-back data relating to a particular part. Further, by including various additional information in the tags, such as machine operating characteristics or the like, the tag data and additional information can be overlaid with the feed-back data so that the end user can use the tag to better understand the feed-back data as they review the feed-back data.

The tagged feed-back data can be accessed as a live stream at 550 or can be stored at 560 and viewed at a later time at 570. The streaming and storage of feed-back data can be performed using any of various known protocols. In some embodiments, it may be possible to select a protocol for use depending on the situation.

In some embodiments, when viewing the feed-back data, the end user may be provided with a list of tagged feed-back data and the end user may then select one or more of the tagged feed-back data, for example, videos, based on the provided list. In some cases, the end user may be able to view all feed-back data associated with a particular part by accessing the part-tag. Alternatively, the end user may be provided with a list of the stored feed-back data. Once the system 400 receives an identification of the data that the end users wishes to review, the selected data is displayed to the end user. As the end user views the tagged feed-back data, the tags are displayed as the video stream plays to assist the end user in understanding the event that has occurred. The end user will have the option to move from tag to tag, and among different types of feed-back data while staying in the same time frame for ease of reference.

In some cases, due to limited storage capacities, certain feed-back data may be removed from storage based on predetermined criteria. For example, if there is a portion within the feed-back data that does not have any tags, this portion of the feed-back data can be deleted from the database as it is unlikely that there is a need for an end user to review this portion of the data. In another embodiment, the data may be deleted if it was stored for a specific length of time.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:
1. A method for diagnosing a manufacturing line having a plurality of automation elements, the method comprising:
    receiving, at a processor, operation data from the plurality of automation elements;

capturing and storing feed-back data based on the operation data at a data collection device associated with the plurality of automation elements;

tagging the feed-back data to include a part-tag associated with at least one part travelling through the manufacturing line when the at least one part is at or passing through each of the plurality of automation elements;

determining a trigger condition based on the operation data from at least one of the plurality of automation elements;

determining a time period based on the trigger condition comprising a predetermined amount of time before and after the trigger condition, wherein the time period is different for different trigger conditions;

tagging the feed-back data for the determined time period to include the trigger condition and the time period in addition to the at least one part associated with the operation data;

displaying, based on the tagging, the feed-back data relating to the at least one part, including feed-back data for each of the plurality of automation elements the at least one part has passed, regardless of the time period based on the trigger condition.

2. The method of claim 1 wherein the capture time period includes a pre-event capture period occurring before the trigger condition.

3. The method of claim 2 wherein the capture time period includes a post-event capture period occurring after the trigger condition.

4. The method of claim 1 wherein the operation data is received from an automation controller that controls operation of the plurality of automation elements, and wherein the trigger condition and the data collection include a configurable setting independent of the automation controller.

5. The method of claim 1 wherein tagging further comprises:
inserting a pre-event time stamp within the feed-back data.

6. The method of claim 1 wherein tagging further comprises:
inserting an indication whether a fault has been detected, whether a part has been rejected or whether a machine state change has been detected.

7. A system for diagnosing a manufacturing line including a plurality of automation elements and operation data related to the plurality of automation elements, the system for diagnosing comprising:
at least one data collection device for collecting feed-back data based on the operation data; and
at least one server module configured to:
receive and store the feed-back data;
tag the feed-back data to include a part-tag associated with a part travelling through the manufacturing line when the at least one part is at or passing through each of the plurality of automation elements;
determine whether there has been a trigger condition based on the operation data;
determining a time period based on the trigger condition comprising a predetermined amount of time before and after the trigger condition, wherein the time period is different for different trigger conditions;
tagging within the collected feed-back data the trigger condition and the time period; and
a display for displaying, based on the tagging, the feed-back data relating to the at least one part, including feed-back data for each of the plurality of automation elements the at least one part has passed, regardless of the time period based on the trigger condition.

8. The system of claim 7 wherein the at least one data collection device comprises:
a memory;
wherein the at least one data collection device is configured to continuously collect feed-back data and store the data in the memory.

9. The system of claim 7 wherein the at least one server module receives operation data from an automation controller that controls operation of the plurality of automation elements, and the at least one server module triggers the data collection device with a configurable setting independent of the automation controller.

10. The system of claim 9, wherein the configurable setting includes a pre-event capture time and a post-event capture time.

11. The system of claim 7 wherein the at least one data collection device is separate and independent of the manufacturing line.

12. The system of claim 7 wherein the at least one server module triggers the at least one data collection device via an application programming interface of the at least one data collection device.

13. The system of claim 7 wherein the system further comprises: at least one data collection server in communication with the at least one data collection device and configured to store the collected feed-back data received from the at least one data collection device.

14. The system of claim 13 wherein the at least one data collection server stores the collected feed-back data for a predetermined storage period.

15. The system of claim 7 wherein the at least one server module comprises:
a processor;
a diagnostic module that, via the processor, determines the events from the operation data and identifies trigger conditions;
a camera trigger module that, responsive to the trigger conditions received from the diagnostic module, generates a trigger;
a camera application programming interface that receives the trigger from the camera trigger module and triggers the camera to provide the predetermined time period of collected feed-back data to the diagnostic module, wherein the diagnostic module outputs the predetermined time period of collected feed-back data to an end user.

* * * * *